July 10, 1951  A. F. REHNBERG ET AL  2,560,475
INDEXING MECHANISM
Filed June 26, 1946  4 Sheets-Sheet 1

Inventors
Axel F. Rehnberg
& John Nelson
Andrew F. Wintercorn
atty

Patented July 10, 1951

2,560,475

UNITED STATES PATENT OFFICE 2,560,475

INDEXING MECHANISM

Axel F. Rehnberg and John Nelson, Rockford, Ill., assignors to Rehnberg-Jacobson Mfg. Co., Inc., Rockford, Ill., a corporation of Illinois Application June 26, 1946, Serial No. 679,536

17 Claims. (Cl. 74—116)

This invention relates to indexing mechanisms for machine tools for performing such operations as drilling, counter-sinking and tapping of holes, and also facing, the invention being concerned with that type of machine in which the pieces of work are mounted at spaced intervals around a rotary turret, wheel or table, and the turret is indexed from one position to another for the performance of a predetermined number of operations thereon in succession.

The principal object of our invention is to provide in lieu of Geneva mechanisms so commonly used for turning the turret through a predetermined angularity in each indexing operation and which imposes certain limitations upon the overall design of the machine, besides being relatively complicated and expensive to manufacture, a reciprocable indexing arm that shifts to an operative plane to take hold of the turret, turns it through a predetermined angularity, shifts to another plane to release the turret, and returns to the starting point to take another hold, the reciprocable indexing arm being shiftable to and from the operative plane and reciprocated in the operative plane and the other plane in timed relation to the oscillation of a rocker arm that inserts and withdraws the locking pin.

A salient feature of the indexing mechanism of our invention, aside from the shifting of the supporting guide for the indexing arm with the pin operating arm, is the provision of a novel mechanical movement whereby the same effect as a lost motion connection between the operating crank and the indexing arm is obtained to permit connection and disconnection of the indexing arm with the turret without any variation in the speed of rotation of the crank. In this way, a rotary cam used for actuating the rocker arm and, indirectly, shifting the indexing arm from one plane to the other may be turned in synchronism with the crank that is used for reciprocating the indexing arm.

The invention is illustrated in the accompanying drawings, in which.

The same reference numerals are applied to corresponding parts throughout the views.

Figures 1, 1A:
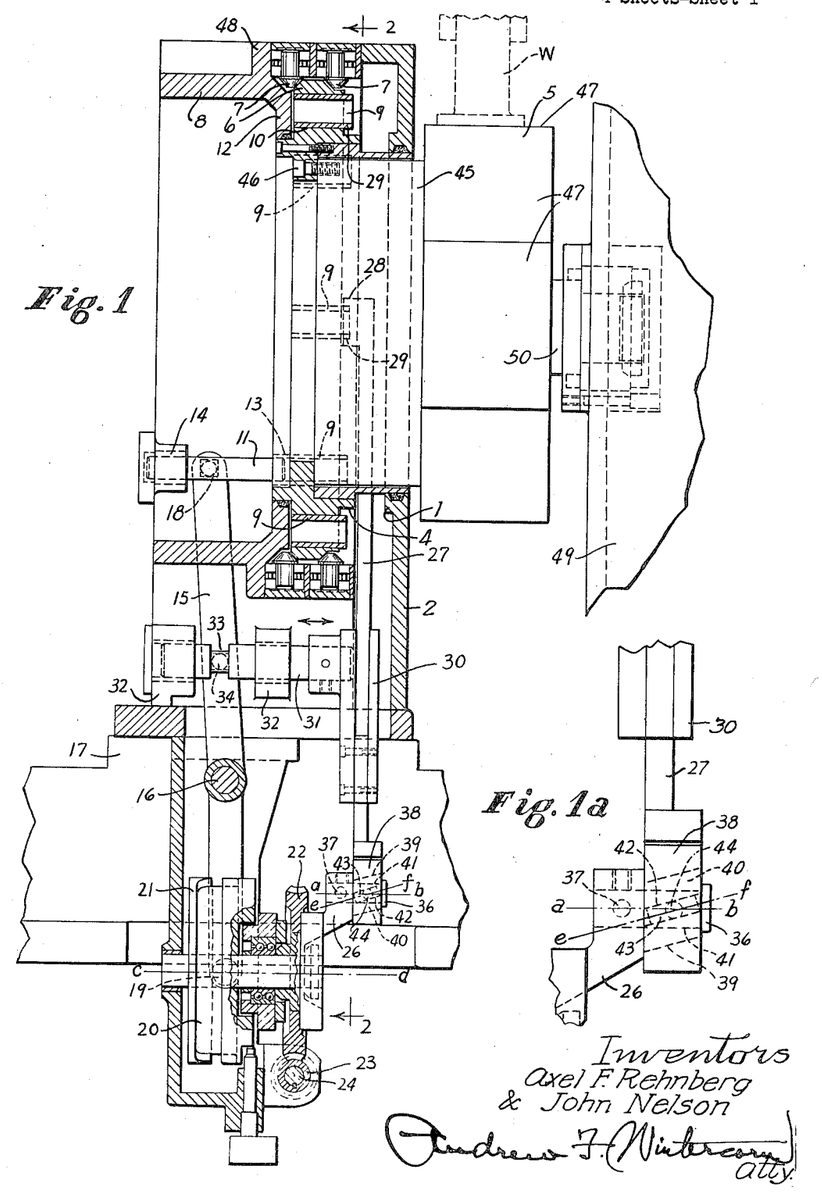
Fig. 1 is a vertical section through a machine tool embodying an indexing mechanism made in accordance with our invention.
Fig. 1a is an enlargement of a portion of Fig. 1, showing the connection between the crank and the indexing arm.
Figure 2:
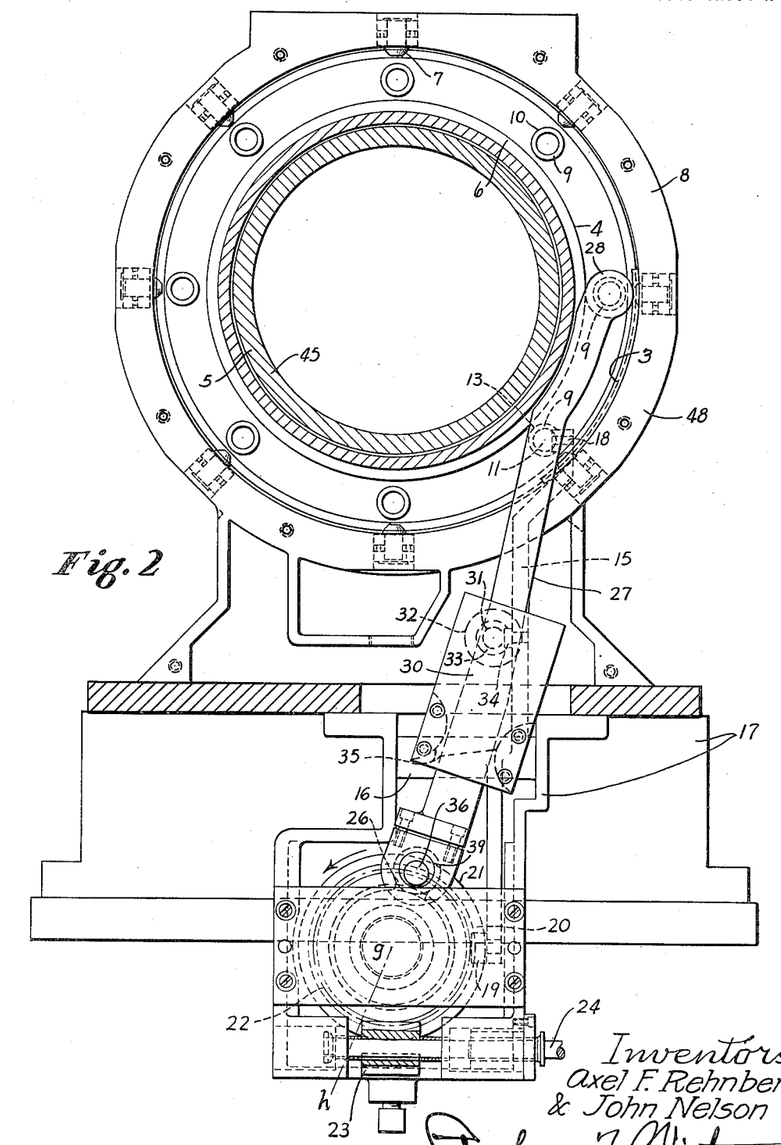
Fig. 2 is a cross section on the line 2—2 of Fig. 1 showing the rotary turret, wheel or table and the indexing arm and its supporting guide in the foreground and the locking pin operating arm in the background.
Figure 3:
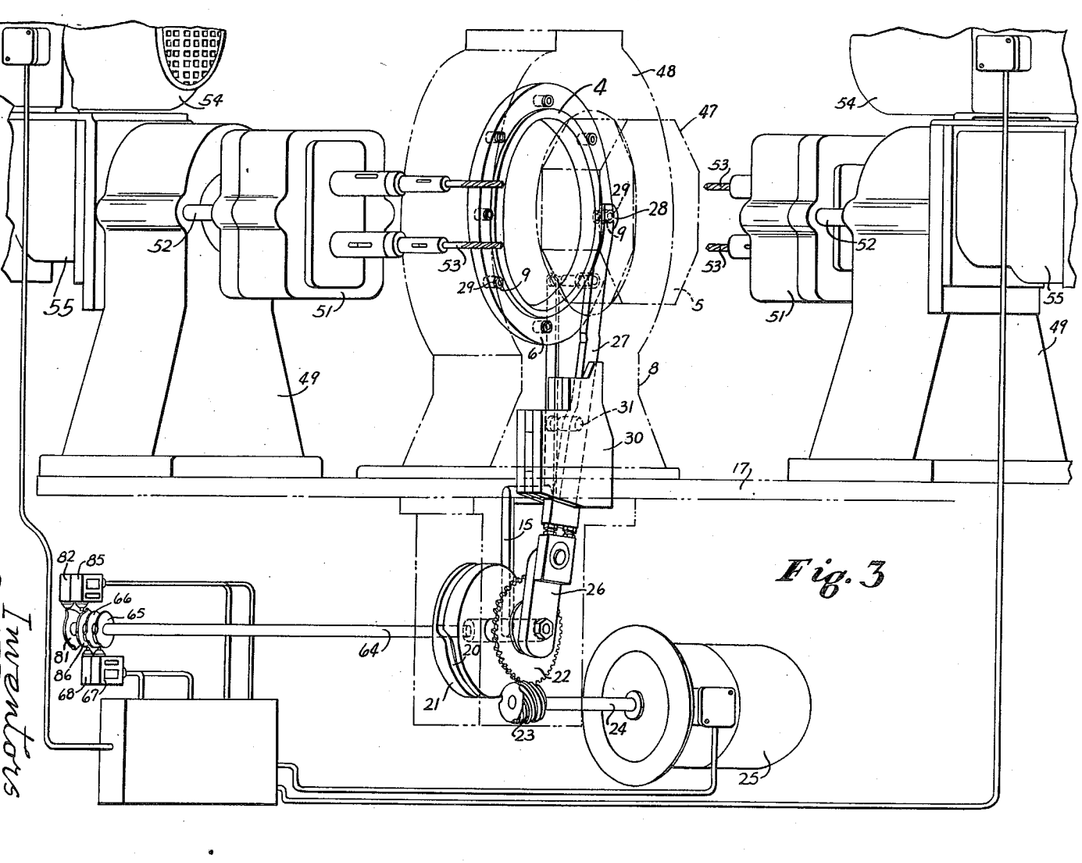
Fig. 3 is a schematic drawing of the machine showing how the indexing is correlated to the operation of the work machining units.

The work holder 5 is suitably secured to the rotary turret, wheel or table or ring 6 that is supported around its rim by anti-friction rollers 7 for easy turning relative to the frame 8. Eight bushings 9 are mounted in equally circumferentially spaced holes 10 in the turret 6, all, of course, on the same radius from the axis of rotation of the turret, which are adapted to receive a locking pin 11 with a close working fit in the eight different positions to which the turret is adapted to be indexed for the performance of certain operations on work pieces mounted on the eight sides of the work holder 5. A circumferentially extending radially inwardly directed wall 12 in the frame 8 has a guide bushing 13 entered in a hole therein to guide the front end of the pin 11 and there is another coaxial guide bearing 14 on the frame 8 slidably guiding the rear end of the pin. When the turret 6 is a turned from one operating position to the next, the bushings 9 are brought into register in succession with the bushing 13 so that the pin 11 can be entered to lock the turret in each indexed position. A rocker arm 15 suitably pivoted intermediate its ends, as indicated at 16, in the base 17 is slidably pivotally connected with the pin 11, as indicated at 18, to move it back and forth in the oscillatory movement of the rocker arm. A cam follower roller 19 is mounted on the lower end of the rocker arm 15 and is entered in an annular cam shaped groove 20 in a cylindrical cam 21 suitably supported for rotation in the base 17. A worm gear 22 suitably connected to the cam 21 to turn it meshes with a worm 23 that is arranged to be driven by a shaft 24, which, as shown in Fig. 3, is the armature shaft of the electric motor 25. A crank 26 is also connected to turn with the cam 21 to communicate reciprocatory movement to a table indexing arm 27. The latter has a socket 28 on the upper end thereof to receive the projecting end portions 29 of the bushings 9 to provide an operating connection between the arm 27 and the turret 6 for the indexing operation.

The arm 27 is slidably supported intermediate its ends in a supporting guide 30 that is provided on one end of a plunger 31 reciprocable in bearings 32 on the frame 8. An annular groove 33 is provided in the plunger 31 between the bearings 32 to receive a finger 34 that projects from the adjacent side of the rocker arm 15 at a point between the pivot 16 for said arm and its upper end. In this way the supporting guide 30 is arranged to be reciprocated to shift the indexing arm 27 from an operative plane, in which it is shown in Fig. 1, where the socket end 28 is attached to one of the bushings 9 on the turret for an indexing operation, to another plane parallel to this first plane, in which the indexing arm 27 is disconnected from the turret 6 and is free to reciprocate from a point at the end of the indexing movement back to the starting point. The fact that the guide 30 is operated by the rocker arm 15 that operates the locking pin 11 insures proper correlation of the movements of the arms 15 and 27, and it is clear in Fig. 1 that it is only when the pin 11 is retracted that the indexing arm 27 is connected to the turret for an indexing operation; in the locking position of the pin 11 the arm 15 is swung to the right and the indexing arm 27 is correspondingly shifted to the right and is, therefore, disconnected from the turret 6. The annular groove 34 permits turning of the plunger 31 with respect to the rocker arm 15 through the small angularity required for the oscillation of the guide 30 with the indexing arm 27 in the operation of the arm 27 by the crank 26. The guide 30 has a wide guideway 35 therein in which the arm 27 is reciprocable freely, because accurate registration of the socket 28 with the bushings 9 in the dead-center position of the crank 26 illustrated in Fig. 2, does not depend on this guide; the socket end 28 of the arm 27 is guided on the turret 6 for movement in an arc between the annular shoulder 4 on the turret and an acuate plate 3 that is secured to the frame 8 and extends through about 50° to reach from one end of the indexing movement of arm 27 to the other. The ring-shaped cover plate 2, which is removable in Fig. 2, for purposes of better illustration, has a rim portion 1 which serves to confine the socket end 28 of arm 27 between the shoulder 4 and plate 3 when the arm 27 is retracted relative to the turret 6. Hence, upon withdrawal of the locking pin 11 by the rocker arm 15, which is timed by the cam 21 to occur approximately when the crank 26 reaches the upper dead-center position, the arm 27 is moved toward the turret 6 and the projecting end portion 29 of the bushing 9 is entered in the socket 28, as shown in Fig. 1.

A crank pin 36 is fixed to the crank 26 on an axis a—b parallel to the axis c—d of revolution of the crank 26 and cam 21 and is suitably secured in rigid relation to the crank 26, as by a cross-pin 37. The indexing arm 27 has a bearing 38 on its lower end in which a cylindrical opening 39 is provided on an axis e—f that is inclined at an acute angle relative to the axis a—b of the pin 36. A cylindrical bushing 40 whose longitudinal axis is inclined the same as the opening 39, on axis e—f, has a longitudinal hole 41 therein at an acute angle to the longitudinal axis e—f on axis a—b in which the pin 36 has a close working fit, the bushing 40 having an easy working fit in the hole 39, and the head end of the pin 36 serving to retain the bushing 40 in said hole. Now, on opposite sides of the bushing 40 are provided grooves 42 in an inclined plane coincident with the axis e—f wherein slide blocks or keys 43 are received, fixed to the bearing 38 by means of trunnions 44 whose centers are on a line that is at right angles to axis a—b and extends through the intersection point of the axes a—b and e—f. With this construction the bearing 38 is obviously free to pivot with respect to the crank 26 on the axis a—b, but is also free to slide in or out on the bushing 40, lengthwise with respect to the crank pin 36 along the axis e—f that is inclined with respect to the crank pin axis a—b. In other words, the bushing 40, in either of the two planes of operation of the indexing arm 27, regardless of its inclined axis e—f, turns on the axis a—b and in that respect acts the same as an integral part of the bearing 38. The bushing 40 is, furthermore, long enough in relation to the extent of shifting movement of the arm 27 from one plane to the other, so that there is no disconnection or even near disconnection of the bearing 38 from the bushing in this movement. Now, the inclination of the axis e—f with respect to the axis a—b, is so accurately correlated to the speed of rotation of the crank 26 that we obtain, in effect a lost motion connection between the arm 27 and the crank 26 so that the turret 6 can and will stop at the limit of its indexing movement and the pin 11 will be inserted to lock it in such position, although rotation of the cam 21 is required for the movement of the rocker arm 15 necessary for this movement of the locking pin 11, and the crank 26 necessarily turns with the cam. In this "lost motion" referred to the crank 26 actually continues to turn at its same speed but the indexing arm 27 is moved outwardly in relation to the crank fast enough so that it has no lineal movement and the locking pin 11 accordingly can enter whichever bushing 9 is then in register with the bushing 13, as the socket 28 is retracted from the projecting end of the same bushing. This action occurs when the crank 26 is approximately in the angular position indicated by the dot and dash line g—h in Fig. 2, that being the end of the indexing operation. The parts are shown in Figs. 1 and 2 at an intermediate or nearly midpoint of the indexing operation, the arm 27 having been moved upwardly from the end of the indexing movement and inwardly so as to take hold of the next bushing 9 preparatory to turning the turret 6 through 45°, and the locking pin 11 having been withdrawn simultaneously with the inward movement of the arm 27. The socket 28 takes hold of the projecting end 29 of the one bushing 9 before the locking pin 11 is completely disengaged from the next preceding bushing 9, because the lineal movement of the socket 28 upon and after engagement with the projecting end 29 of a bushing 9 is slightly greater than the lineal movement of the locking pin 11 after disengagement from the next preceding bushing 9, as clearly appears in Fig. 1. With this overlapping of control between the arms 15 and 27, the table 6 is never free to turn independently of both arms. In the reconnection of the arm 27 with the turret 6 the same lost motion effect is obtained as previously described insofar as the crank 26 is concerned, the crank being turned at a constant speed while the socket 28 is moved into engagement with the projecting end 29 of the bushing 9.

In the indexing of the turret or table 6, the work support 5, which is fastened to the turret by means of its hub portion 45, as indicated at 46, is arranged to turn so as to line up work pieces on the flat faces 47 with the drills, reamers, facing tools and the like, which may be arranged to operate on the work pieces from either or both sides of the support 5. Thus, for example, there is indicated at W a work piece supported on the top face 47 of the work support 5 projecting beyond the radius of the substantially circular rim portion 48 of the frame 8, so that it may be operated upon from the left and right hand sides of the frame 8 by tools moving parallel to the axis of indexing of the turret 6 and disposed on radii larger than the radius of portion 48 of the frame 8, as shown in Fig. 3. A housing 49 into which an axle portion 50 on the work support 5 projects for bearing support may be one of two tool supports on opposite sides of the frame 8, as appears in Fig. 3, tool heads 51 being reciprocable relative to said tool supports on guide rods 52 and carrying a multiplicity of drills or other tools, as indicated at 53, driven by electric motors 54 through suitable spindle units 55 that provide for rapid approach, feed, and rapid return movements of the tools in the manner fully set forth in Rehnberg Patent No. 2,234,452.

Figure 4:
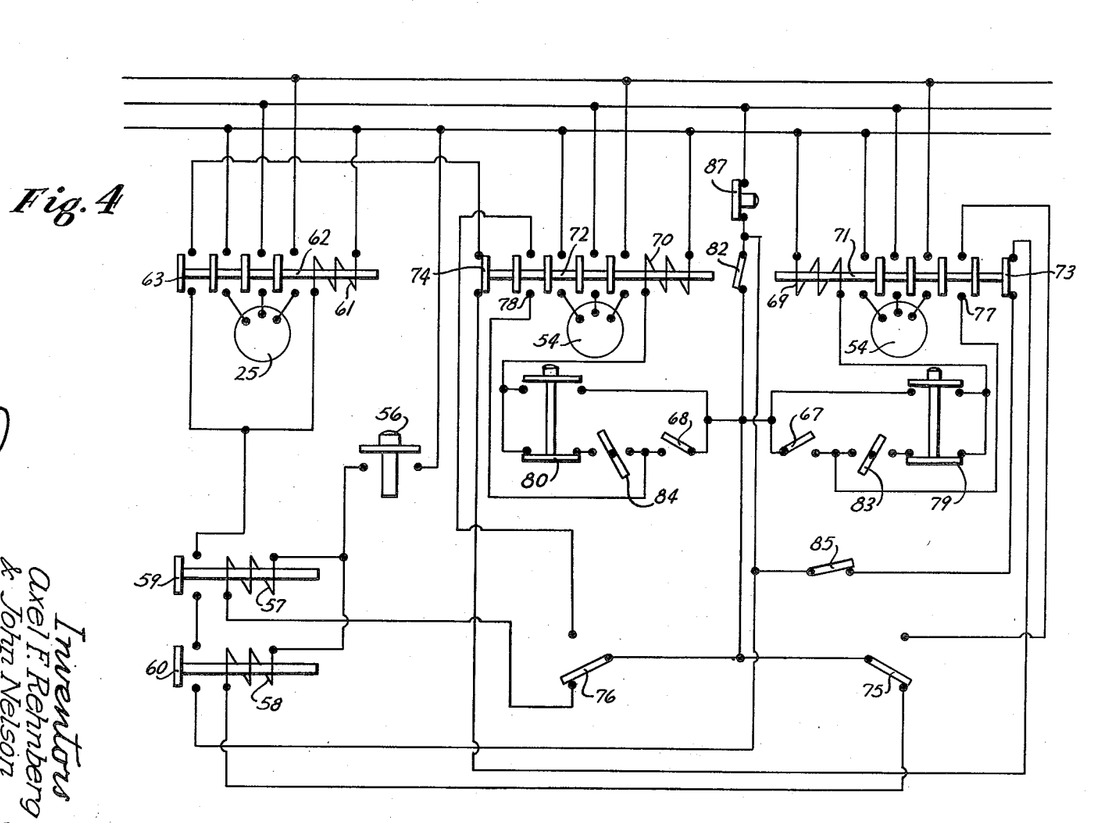
Fig. 4 is an electrical wiring diagram.

The operation of the machine can best be visualized by reference to the wiring diagram, Fig. 4. When the push button 56 is momentarily depressed, coils 57 and 58 of control relays are energized, thereby closing the switches 59 and 60 and energizing the coil 61 to close the contactor 62 with the interlock 63. The latter serves to keep the coil 61 energized, thereby operating the indexing motor 25. The armature shaft 24 of this motor drives the worm 23 and worm gear 22, thereby causing the control shaft 64 to turn and with it the cam 21 and crank 26. In that way, the rocker arm 15 for operating the locking pin 11, and the indexing arm 27 for turning the turret or table 6 from one position to another, as previously described, are operated. When the turret 6 has been moved through 45° from one indexed position to another, cams 65 and 66 will momentarily close limit switches 67 and 68 and energize coils 69 and 70 to close contactors 71 and 72 so as to start the motors 54 driving the drills, reamers, and/or other tools, of which the tools 53 in Fig. 3 are typical. When the contactors 71 and 72 are closed, the interlocks 73 and 74 are opened, thereby stopping the indexing motor 25 so that there will be no further turning of the cam 21 and crank 26, this occurring when the crank 26 is approximately in the angular position g—h marked in Fig. 2. When the motors 54 have caused the spindle heads 51 to move forwardly to a predetermined extent, limit switches 75 and 76, which are similar to those shown in the Rehnberg Patent 2,234,452, are closed and the coils 69 and 70 are kept energized through these limit switches and interlocks 77 and 78. If, however, the operator is running the machine by means of jog buttons 79 and 80, the dog 81 keeps the limit switch 82 closed to permit such jogging only while the control shaft 64 is in the correct position. In setting up the machine, when the operator may want to go through the indexing operation without having the motors 54 running, selector switches 83 and 84 are kept open to prevent the limit switches 67 and 68 from starting the motors 54. In this case, the limit switch 85 is operated by the cam 86 to stop the control shaft 64 in the correct position. The switch 87 is an emergency stop switch which the operator may open at any time, as, for example, in the event of a broken drill or reamer or other tool, and whenever stoppage of the machine to prevent damage or for any other reason may be necessary.

We have also obtained the same results with the following variation of the indexing mechanism: The indexing arm, instead of being shiftable from one plane to another, like arm 27, is adapted to be oscillated about its longitudinal axis, the socket for connection to the end 29 of the bushings 9 being on an arm on the upper end of the indexing arm to be engaged on and disengaged from the bushings 9 by oscillation of the indexing arm, and the lower end of the indexing arm having an operating connection with the crank pin 36 for reciprocation of the indexing arm with rotation of the crank 26, said connection, however, including a sort of steeply-pitched threaded connection whereby the same effect as lost motion is obtained as with the bushing 40 when the indexing arm is turned on its longitudinal axis in one direction or the other relative to its connection to the crank pin, the indexing arm being given the necessary oscillatory movement in timed relation with the operation of the rocker arm that operates the locking pin so that the indexing arm is connected with the turret 6 for the indexing movement automatically when the locking pin 11 is withdrawn, and is automatically disconnected from the turret 6 when said pin is inserted.

It is believed the foregoing description conveys a good understanding of the objects and advantages of our invention. The appended claims have been drawn to cover all legitimate modifications and adaptations.

We claim:

1. In a machine tool, in combination with a frame, a turret rotatable thereon having substantially flat opposite sides and having a plurality of pin holes in equally circumferentially spaced relation and a plurality of equally circumferentially spaced projections, a locking pin guided on said frame on one side of said turret for engagement successively in said pin holes, a rocker arm disposed in substantially parallel relation to one side of said turret and connected with said pin to reciprocate it, an indexing arm disposed in substantially parallel relation with the other side of said turret reciprocable in either of two planes substantially parallel to the latter side of the turret and engageable with said projections in succession when disposed in one of the planes to index the turret, means for rocking the rocker arm to operate the locking pin, means movable to and fro with the rocker arm to shift the reciprocable arm from one plane to the other to engage and disengage said indexing arm from said projections, and means for reciprocating the indexing arm in one direction while engaged with a projection and in the opposite direction while disengaged.

2. In a machine tool, in combination with a frame, a turret rotatable thereon having substantially flat opposite sides and having a plurality of pin holes in equally circumferentially spaced relation and a plurality of equally circumferentially spaced projections, a locking pin guided on said frame on one side of said turret for engagement successively in said pin holes, a rocker arm disposed in substantially parallel relation to one side of said turret and connected with said pin to reciprocate it, an indexing arm disposed in substantially parallel relation with the other side of said turret reciprocable in either of two planes substantially parallel to the latter sides of the turret and engageable with said projections in succession when disposed in one of the planes to index the turret, means for rocking the rocker arm to operate the locking pin, guide means for the reciprocable indexing arm connected for operation with the locking pin to shift the reciprocable indexing arm from one plane to the other to engage and disengage said reciprocable indexing arm from said projections, and means for reciprocating the indexing arm in one direction while engaged with a projection and in the opposite direction while disengaged.

3. In a machine tool, in combination with a frame, a turret rotatable thereon having substantially flat opposite sides and having a plurality of pin holes in equally circumferentially spaced relation and a plurality of equally circumferentially spaced projections, a locking pin guided on said frame on one side of said turret for engagement successively in said pin holes, a rocker arm disposed in substantially parallel relation to one side of said turret and connected with said pin to reciprocate it, an indexing arm disposed in substantially parallel relation with the other side of said turret reciprocable in either of two planes substantially parallel to the latter side of the turret and engageable with said projections in succession when disposed in one of the planes to index the turret, guide means for the indexing arm connected for operation with the locking pin to shift the reciprocable indexing arm from one plane to the other to engage and disengage said indexing arm from said projections, a single rotary unit operatively connected to said rocker arm to operate the locking pin and operatively connected with said indexing arm to reciprocate it in either plane, and means in the operating connection with said indexing arm operable in the shifting of the indexing arm from one plane to the other to compensate for the continued turning of said rotary unit so that there is in effect the same engagement on or disengagement from a projection as if the rotary unit were stationary.

4. In a machine tool, in combination with a frame, a turret rotatable thereon having substantially flat opposite sides and having a plurality of pin holes in equally circumferentially spaced relation and a plurality of equally circumferentially spaced projections, a locking pin guided on said frame on one side of said turret for engagement successively in said pin holes, a rocker arm disposed in substantially parallel relation to one side of said turret and connected with said pin to reciprocate it, an indexing arm disposed in substantially parallel relation with the other side of said turret reciprocable in either of two planes substantially parallel to the latter side of the turret and engageable with said projections in succession when disposed in one plane to index the turret, a rotary cam for rocking the rocker arm, a crank turning with the cam and connected with the indexing arm to reciprocate it in one direction while engaged with a projection and in the opposite direction while disengaged, and means operable to and fro with the rocker arm to shift the indexing arm from one plane to the other to engage and disengage said reciprocable arm from said projections.

5. In a machine tool, in combination with a frame, a turret rotatable thereon having a plurality of pin holes in equally circumferentially spaced relation and a plurality of equally circumferentially spaced projections, a locking pin guided on said frame for engagement successively in said pin holes, a rocker arm connected with said pin to reciprocate it, an indexing arm reciprocable in either of two planes substantially parallel with the turret and engageable with said projections in succession when disposed in one plane to index the turret, a rotary cam for rocking the rocker arm, a crank turning with the cam and connected with the indexing arm to reciprocate it in one direction while engaged with a projection and in the opposite direction while disengaged, means operable to and fro with the rocker arm to shift the indexing arm from one plane to the other to engage and disengage said reciprocable arm from said projections, and including lost motion means in the connection between said crank and said indexing arm whereby said arm is given compensating movements in relation to crank movement at the time of engagement and disengagement of said arm with said projections.

6. In a machine tool, in combination with a frame, a turret rotatable thereon having a plurality of pin holes in equally circumferentially spaced relation and also a plurality of equally circumferentially spaced projections, a locking pin guided on said frame for engagement successively in said pin holes, means connected with said pin to operate it, a reciprocable index arm reciprocable in either of two planes substantially parellel to the turret and engageable with said projections in succession when disposed in one plane to index the turret, a rotary unit including a crank pin for communicating reciprocatory movement to said index arm, said arm having a bearing portion for connection with said crank pin, a bushing rotatable on said crank pin on an axis parallel to the axis of rotation of said rotary unit but generated on an axis inclined at an acute angle to the axis of said pin and having a sliding fit in a similarly inclined hole provided in said bearing portion and held against turning with respect to said hole, and guide means for the index arm connected for operation with the locking pin to shift the index arm from one plane of engagement with the projections to another in timed relation to the operation of the locking pin plane of disengagement whereby to shift said index arm endwise relative to the crank pin.

7. In a machine tool, in combination with a frame, a turret rotatable thereon having bushings mounted therein in equally circumferentially spaced relation and projecting therefrom, a locking pin guided on said frame for engagement successively in said bushings between indexing movements of the turret, said turret having an annular shoulder provided thereon and said frame having an annular guide surface in concentric relation to said annular shoulder, an indexing arm having a projecting socket portion on one end slidably guided between said annular shoulder and said guide surface for movement in an arc from one end of the indexing movement to the other, said arm being operable in either of two planes substantially parallel to the turret and said socket portion being adapted when the arm is in one plane to receive the projecting end portions of said bushings in succession, means operatively connected with the other end of said indexing arm to communicate reciprocatory movement thereto, means for operating the locking pin, and guide means for the indexing arm connected for operation with the locking pin so that the indexing arm is shifted in timed relation to the operation of the locking pin from an operative plane in engagement with the projecting end of a bushing to an inoperative plane disengaged from said bushings.

8. In a machine tool, a combination with a frame, a turret rotatable thereon having equally circumferentially spaced holes and projections, a locking pin guided on said frame for engagement successively in said holes between indexing movements of the turret, said turret having an annular shoulder provided thereon and said frame having an annular guide surface in concentric relation to said annular shoulder, an indexing arm having a projecting socket portion on one end slidably guided between said annular shoulder and said guide surface for movement in an arc from one end of the indexing movement to the other, said arm being operable in either of two planes substantially parallel to the turret and said socket adapted when the arm is in one plane to receive the projections in succession, means operatively connected with the other end of said indexing arm to communicate reciprocatory movement thereto, means for operating the locking pin, and guide means for the indexing arm connected for operation with the locking pin so that the indexing arm is shifted in timed relation with the operation of the locking pin from an operative plane in engagement with a projection to an inoperative plane disengaged from said projections.

9. In a machine tool, in combination with a frame, a turret rotatable thereon having bushings mounted therein in equally circumferentially spaced relation and projecting therefrom, a locking pin guided on said frame for engagement and successively in said bushings between indexing movements of the turret, said turret having an annular shoulder provided thereon and said frame having an annular guide surface in concentric relation to said annular shoulder, an indexing arm having a projecting socket portion on one end slidably guided between said annular shoulder and said guide surface for movement in an arc from one end of the indexing movement to the other, said arm being operable in either of two planes substantially parallel to the turret and said socket portion being adapted when the arm is in one plane to receive the projecting end portions of said bushings in succession, a crank having a crank pin operatively connected with the other end of said indexing arm to reciprocate said arm in the rotation of said crank, the operative connection including a bushing generated on an axis inclined at an acute angle to the axis of the crank pin but rotatable relative to said crank pin on its axis and non-rotatably slidable endwise in an inclined hole provided therefor in the end of the indexing arm, means for operating the locking pin, and guide means for the indexing arm connected for operation with the locking pin so that the indexing arm is shifted in timed relation with the operation of the locking pin from an operative plane in engagement with the projecting end of a bushing to an inoperative plane disengaged from said bushings, whereby also to shift said indexing arm endwise relative to said bushing.

10. In a mechanical movement, a motion compensating means comprising in combination with a rotary crank having a crank pin, and a a pitman element operable by connection of a bearing on the end thereof with the crank pin, of a bushing generated on an axis inclined at an acute angle to the axis of said pin but rotatable on said pin on its axis and non-rotatably slidable endwise in an inclined hole provided therefor in the pitman element bearing, and means for causing relative endwise movement between the bushing and the pitman element bearing in the rotation of the crank.

11. In a mechanical movement, comprising a rocker arm and a reciprocable arm adapted to be operated in a predetermined timed relationship, a rotary unit for communicating oscillatory movement to the rocker arm and including a crank pin for operative connection with a bearing on the reciprocable arm, means operable in timed relation with the oscillatory movement of the rocker arm to shift the reciprocable arm from one plane of operation to another plane parallel to the first plane and accordingly shift said bearing, and a bushing for operatively connecting the bearing on said reciprocable arm to said crank pin, said bushing being generated on an axis inclined at an acute angle to the axis of said crank pin but rotatable on the crank pin axis and non-rotatably slidable endwise in an inclined hole provided therefor in the bearing on said reciprocable arm.

12. In a mechanical movement, comprising a rocker arm and a reciprocable arm adapted to be operated in a predetermined timed relationship, a rotary unit for communicating oscillatory movement to the rocker arm and including a crank pin for operative connection with a bearing on the reciprocable arm, a bushing for operatively connecting said crank pin and the bearing on said reciprocable arm generated on an axis inclined at an acute angle to the axis of the crank pin but rotatable on the crank pin axis and non-rotatably slidable endwise in an inclined hole provided therefor in the bearing on said reciprocable arm, and means operable in timed relation with the oscillatory movement of said rocker arm for causing relative endwise movement between said bushing and said bearing on said reciprocable arm.

13. In a mechanical movement, comprising a rocker arm and a reciprocable arm adapted to be operated in a predetermined timed relationship, a rotary unit for communicating oscillatory movement to the rocker arm and including a crank pin for operative connection with the reciprocable arm and revolving at a uniform speed, means connecting the crank pin and the reciprocable arm so as to provide movement compensation therebetween equivalent to a predetermined movement of the crank pin upon a certain extra movement of said reciprocable arm relative to said crank pin, and means operated in timed relation with the oscillatory movement of said rocker arm to give the reciprocable arm the extra movement.

14. In a mechanical movement, a part having a series of projections thereon, an arm reciprocable endwise and having a socket portion carried thereby and adapted to be engaged and disengaged from any one of the series of projections on said part when the arm is given a movement other than the reciprocatory movement mentioned, a crank turning at a substantially uniform speed and connected to said arm to give it the reciprocatory movement mentioned, means for giving said arm the other movement, and movement compensation means between the crank arm affected by this other movement so that the socket is engageable or disengageable from the projections in the continued turning of the crank in the same way as though the crank were stationary during the said other movement of said arm.

15. In mechanism for effecting rotary step-by-step motion, the combination with a frame, a rotatable part mounted on the frame to receive step-by-step motion, a locking pin guided on said frame for movement toward and away from one side of the rotary part for engagement successively in holes provided in said rotary part in circumferentially spaced relation, a rocker arm for operating said locking pin, said rotary part having projections on its other side in equally circumferentially spaced relation, a reciprocable arm having means on one end thereof to engage said projections successively to index the rotary part, a power operated rotary cam and rotary crank turning together, the rotary cam being operatively connected with the rocker arm to oscillate the same, and the crank being operatively connected by means of a crank pin with the reciprocating arm to reciprocate the same, means operable in the oscillation of the rocker arm to shift the reciprocating arm toward and away from the rotary part, and compensating means between the crank pin and the reciprocating arm interconnecting said pin and arm so that the arm has no lineal movement during a given angular movement of the crank when the reciprocating arm is shifted in response to oscillation of the rocker arm.

16. In a mechanism for effecting rotary step-by-step motion, the combination with a frame, a rotatable part mounted on the frame to receive step-by-step motion, a locking pin guided on said frame for movement toward and away from the rotary part for engagement successively in holes provided in said rotary part in circumferentially spaced relation, a rocker arm for operating said locking pin, said rotary part having projections thereon in equally circumferentially spaced relation, a reciprocable arm having means on one end thereof to engage said projections successively to index the rotary part, a power operated rotary cam and rotary crank turning together, the rotary cam being operatively connected with the rocker arm to oscillate the same, and the crank being operatively connected by means of a crank pin with the reciprocating arm to reciprocate the same, means operable in the oscillation of the rocker arm to shift the reciprocating arm toward and away from the rotary part, and compensating means between the crank pin and the reciprocating arm interconnecting said pin and arm so that the arm has no lineal movement during a given angular movement of the crank when the reciprocating arm is shifted in response to oscillation of the rocker arm.

17. In a mechanism for effecting rotary step-by-step motion, the combination with a frame, a rotatable part mounted on the frame to receive step-by-step motion and carrying bushings in equally circumferentially spaced relation on axes parallel to the axis of rotation which project from one side of said rotary part, a locking pin guided on said frame for movement toward and away from one side of the rotary part for engagement successively in said bushings, a rocker arm for operating said locking pin, a reciprocable arm having means on one end thereof to engage the projecting ends of said bushings successively to index the rotary part, a power operated rotary cam and rotary crank turning together, the rotary cam being operatively connected with the rocker arm to oscillate the same, and the crank being operatively connected by means of a crank pin with the reciprocating arm to reciprocate the same, means operable in the oscillation of the rocker arm to shift the reciprocating arm toward and away from the rotary part, and compensating means between the crank pin and the reciprocating arm interconnecting said pin and arm so that the arm has no lineal movement during a given angular movement of the crank when the reciprocating arm is shifted in response to oscillation of the rocker arm.

AXEL F. REHNBERG.
JOHN NELSON.

REFERENCES CITED

The following references are of record in the file of this patent:

UNITED STATES PATENTS

| Number | Name | Date |
|---|---|---|
| 646,287 | Hundhausen | Mar. 27, 1900 |
| 1,405,058 | Moore | Jan. 31, 1922 |
| 2,393,294 | Crane | Jan. 22, 1946 |

FOREIGN PATENTS

| Number | Country | Date |
|---|---|---|
| 117,495 | Great Britain | July 19, 1918 |

Certificate of Correction

July 10, 1951

Patent No. 2,560,475

AXEL F. REHNBERG ET AL.

It is hereby certified that error appears in the printed specification of the above numbered patent requiring correction as follows:

Column 6, line 61, for "sides" read *side*; column 8, line 2, strike out "including"; lines 33 and 34, strike out "in timed relation to the operation of the locking pin" and insert the same in line 31, same column, after "arm"; and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*